United States Patent
Baker et al.

(10) Patent No.: US 8,645,287 B2
(45) Date of Patent: Feb. 4, 2014

(54) IMAGE TAGGING BASED UPON CROSS DOMAIN CONTEXT

(75) Inventors: Simon John Baker, Medina, WA (US); Ashish Kapoor, Kirkland, WA (US); Gang Hua, Los Angeles, CA (US); Dahua Lin, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 12/699,889

(22) Filed: Feb. 4, 2010

(65) Prior Publication Data

US 2011/0191271 A1    Aug. 4, 2011

(51) Int. Cl.
*G06F 17/00* (2006.01)

(52) U.S. Cl.
USPC .................. 706/11; 706/12; 706/52

(58) Field of Classification Search
USPC ................ 706/11, 12, 52
See application file for complete search history.

(56) References Cited

U.S. PATENT DOCUMENTS

| | | |
|---|---|---|
| 7,181,046 B2 | 2/2007 | Colmenarez et al. |
| 7,587,101 B1 | 9/2009 | Bourdev |
| 2008/0002914 A1 | 1/2008 | Vincent et al. |
| 2008/0204317 A1 | 8/2008 | Schreve et al. |
| 2008/0282177 A1 | 11/2008 | Brown et al. |
| 2008/0298643 A1 | 12/2008 | Lawther et al. |
| 2008/0298690 A1 | 12/2008 | Oh et al. |
| 2009/0096808 A1 | 4/2009 | Winn et al. |
| 2009/0129638 A1 | 5/2009 | Kim |
| 2009/0252383 A1 | 10/2009 | Adam et al. |
| 2009/0252413 A1 | 10/2009 | Hua et al. |

FOREIGN PATENT DOCUMENTS

EP    2040185 A1    3/2009

OTHER PUBLICATIONS

Naaman et al ("Leveraging Context to Resolve Identity in Photo Albums" Jun. 2005).*
Li et al ("Semi-supervised Learning for Image Annotation Based on Conditional Random Fields" CIVR 2006).*
Kapoor et al ("Which Faces to Tag: Adding Prior Constraints into Active Learning" Sep. 2009).*
Suh et al ("Semi-automatic photo annotation strategies using event based clustering and clothing based person recognition" Mar. 2007).*
Anguelov et al ("Contextual Identity Recognition in Personal Photo Albums" 2007).*
Hare et al ("Context-Aware Person Identification in Personal Photo Collections" Feb. 2009).*

(Continued)

*Primary Examiner* — Lut Wong
(74) *Attorney, Agent, or Firm* — Steve Wight; Carole Boelitz; Micky Minhas

(57) ABSTRACT

A method described herein includes receiving a digital image, wherein the digital image includes a first element that corresponds to a first domain and a second element that corresponds to a second domain. The method also includes automatically assigning a label to the first element in the digital image based at least in part upon a computed probability that the label corresponds to the first element, wherein the probability is computed through utilization of a first model that is configured to infer labels for elements in the first domain and a second model that is configured to infer labels for elements in the second domain. The first model receives data that identifies learned relationships between elements in the first domain and elements in the second domain, and the probability is computed by the first model based at least in part upon the learned relationships.

20 Claims, 8 Drawing Sheets

(56) References Cited

OTHER PUBLICATIONS

Zhao et al ("Combining Metadata and Context Information in Annotating Personal Media" 2007).*
Hasan et al (Bridging the Motivation Gap for Individual Annotators: What Can We Learn From Photo Annotation Systems? 2008).*
"International Search Report", Mailed Date: Sep. 29, 2011, Application No. PCT/US2011/023795, Filed Date: Feb. 4, 2011, pp. 1-9.
Albanesius, Chloe, "Picasa 3.5 Incorporates Photo Tagging, Google Maps", Retrieved at <<http://www.pcmag.com/article2/0,2817,2353204,00.asp>> Sep. 22, 2009, pp. 1-3.
Gallagher, et al., "Image Annotation Using Personal Calendars as Context", Retrieved at <<http://amp.ece.cmu.edu/people/Andy/Andy_files/ctsp4175-gallagher.pdf>> In the proceedings of the 16th international conference on Multimedia, Oct. 26-31, 2008, pp. 1-4.
Anguelov, et al., "Contextual Identity Recognition in Personal Photo Albums," In Proc. of CVPR'07, 2007, pp. 1-7.
Kapoor, et al., "Which Faces to Tag: Adding Prior Constraints into Active Learning," In Proc. of ICCV'09, 2009, pp. 1-8.
Davis, et al. "Towards Context-Aware Face Recognition," In Proc. of 13th ACM Conf. on Multimedia, 2005, pp. 1-4.
Davis, et al., "Using Context and Similarity for Face and Location Identification," In Proc. of SPIE'06, 2006, pp. 1-9.
Gallagher, et al., "Using Group Prior to Identify People in Consumer Images," In Proc. of CVPR Workshop on SLAM'07, 2007, pp. 1-8.
Gallagher, et al., "Using a Markov Network to Recognize People in Consumer Images," In Proc. of ICIP'06, 2006, pp. 1-4.
Gallagher, et al., "Using Context to Recognize People in Consumer Images," IPSJ Transactions on Computer Visions and Applications, vol. 1, pp. 115-126, 2009.
Naaman, et al., "Leveraging Context to Resolve Identity in Photo Albums," In Proc. of 5th ACM/IEEE-CS Joint Conf. on Digital Libraries, 2005, pp. 1-10.
Song, et al., "Context-Aided Human Recognition—Clustering," In Proc. of ECCV'06, 2006, pp. 1-14.
Stone, et al., "Autotagging Facebook: Social Network Context Improves Photo Annotation," In Proc. of Internet Vision Workshop'08, 2008, pp. 1-8.
Zhang, et al., "Automated Annotation of Human Faces in Family Albums," In Proc. of 11th Acm Conf. on Multimedia, 2003, pp. 1-4.

* cited by examiner

FIG. 4

| PEOPLE / EVENTS | PERSON 1 | PERSON 2 | PERSON 3 | PERSON 4 |
|---|---|---|---|---|
| EVENT 1 | 0 | 0 | 0.9 | 0.9 |
| EVENT 2 | 0.9 | 0.9 | 0 | 0 |

IMAGE TAGGING BASED UPON CROSS DOMAIN CONTEXT

BACKGROUND

Due at least in part to continuing evolution of technology and reduction in cost, digital cameras are extremely popular. For example, many portable cell phones are currently equipped with a digital camera. Digital cameras allow users to capture a relatively large amount of images over time and store them in a data repository of a computing device. Conventionally, these captured images are automatically organized based upon time that each respective image was captured. The owner of the images may manually provide names to images to provide an indication of content of images (e.g., who is in certain images, etc.).

Digital image organization applications are currently available that allow individuals to provide tags or labels to images. For instance, an individual may review an image and assign a tag thereto that indicates that a particular person is captured in the image. Thereafter, the individual may organize images based upon tags assigned to such images. In an example, if the individual wishes to be provided with all images that include a particular person, the individual can organize images by selecting a graphical icon that corresponds to the particular person. This can cause a collection of images to be presented to the individual, where each image in the collection includes the particular person.

While allowing users to tag images is a relatively effective mechanism for organizing images, tagging images in a large collection of images can be quite time consuming. Therefore, facial recognition applications have been incorporated into image organization applications to aid in automatically and/or semi-automatically tagging images based upon faces recognized in images. Generally, an image can be analyzed and features can be extracted therefrom that may pertain to identities of individuals in the image, such as eye color of an individual, color of clothing being worn, shape of a nose of an individual, amongst other features. Such features are provided to a mathematical model for facial recognition and the mathematical model is configured to output with a certain probability that a face in an image corresponds to a particular person. While utilizing the facial recognition application to aid in automatically tagging photos has been beneficial in connection with increasing efficiency of tagging images, accuracy of the facial recognition applications can be less than desired.

SUMMARY

The following is a brief summary of subject matter that is described in greater detail herein. This summary is not intended to be limiting as to the scope of the claims.

Described herein are various technologies pertaining to automatically and semi-automatically assigning a tag to an image through utilization of a robust framework. The framework described herein comprises models of multiple domains and learned relational models between such domains. In an example, the framework can include a semantic layer and a feature layer. The semantic layer can include models of multiple domains. For example, these domains may include a people domain that represents people that may be included in a collection of images, an event domain that represents one or more events that may correspond to the images, and a location domain that represents locations that may correspond to the images. Each image may have one or more elements that correspond to the domains. For instance, an image may include three different individuals, wherein each of the individuals can be an element in the people domain. In another example, the image may correspond to a particular event, wherein the event can be an element in the event domain. Similarly, the image may pertain to a certain location, wherein the certain location can be an element in the location domain.

Each element in an image can have a label associated therewith that is desirably inferred. For instance, the image may include multiple individuals, and it may be desirable to infer names of each of the individuals. In another example, the image may pertain to a certain event, and it may be desirable to infer a name of such event. Information from complementary sources can be utilized in connection with inferring labels for elements in an image.

A first source can be observed features in images in a collection of images. For example, each element in an image can be characterized by one or more observed features. For instance, a person can be described by his or her face appearance and clothing. Similarly, a time stamp corresponding to a digital image may be utilized to characterize an event captured in the digital image. In another example, activities observed in an image may be utilized to characterize an event. Further, GPS tags can offer information pertaining to location where an image was captured. In another example, automated background scene analysis can be used to characterize a location (e.g., a color signature can characterize a location).

A second complementary source utilized to infer labels of elements can be cross-domain context (e.g., how a label of an element in a domain affects labels of elements in other domains). Specifically, co-occurrence of elements in an image can constitute a semantic context. Due to learned relations between co-occurring elements, such semantic context can convey information pertaining to how an element is to be labeled. Hence, the framework exploits the semantic context in connection with inferring labels for elements in different domains in images. For example, the framework can be configured to consider relations between which people attend which event, which people tend to be in the same image, which event happens at which location, and which people are in certain locations. Thus, the framework may include multiple probabilistic models that pertain to certain domains, wherein the probabilistic models are utilized to infer labels for elements in certain domains. The probabilistic models can utilize features extracted from images to make such inferences, and can further utilize learned relationships between elements across the domains.

In operation, the framework can be provided with a collection of digital images. Thereafter, features can be extracted from such images, including facial features, characteristics of clothing worn by an individual captured in the digital images, time stamps corresponding to digital images, data pertaining to background scenes captured in the digital images, etc. A user can be invited to manually label a small set of people, events and locations corresponding to images in the collection of digital images. Based at least in part upon the extracted features and labels provided by the user, relational models between domains can be learned in an iterative manner based at least in part upon labels provided by the user and labels inferred for elements by the probabilistic models.

Other aspects will be appreciated upon reading and understanding the attached figures and description.

BRIEF DESCRIPTION OF THE DRAWINGS

FIG. 4 is an example relational table.

DETAILED DESCRIPTION

Figure 1:
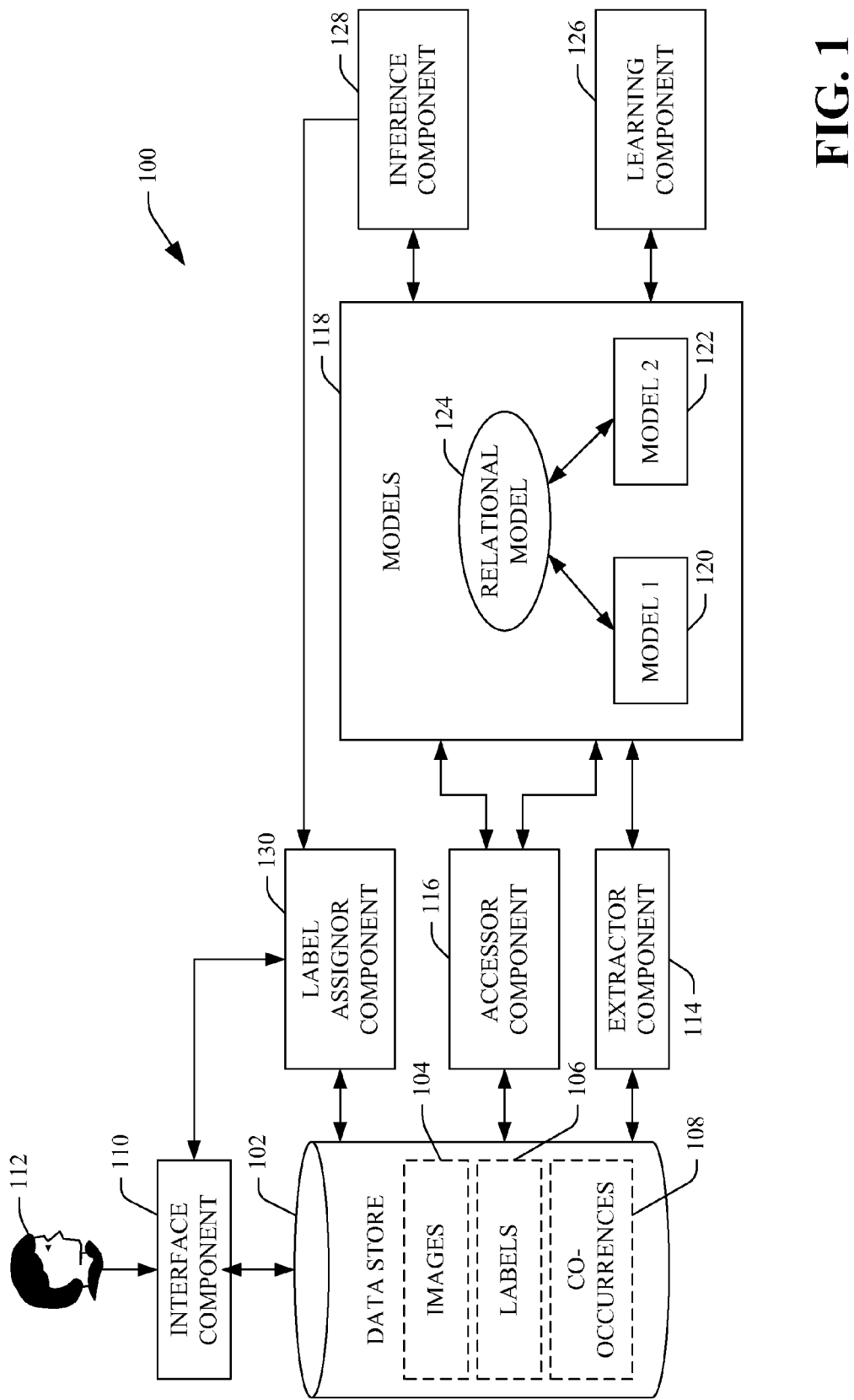
FIG. 1 is a functional block diagram of an example system that facilitates automatically assigning labels to a collection of images.

Various technologies pertaining to automatically assigning one or more labels to a digital image will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates automatically or semi-automatically assigning one or more labels to at least one image in a collection of images is illustrated. The system 100 comprises a data store 102 which can be a hard drive, a memory, a portable flash drive, a CD, DVD or other suitable computer implemented data store. The data store 102 comprises a collection of images 104, a plurality of labels 106 assigned to such images 104, and co-occurrences of labels across a subset of the images 104. As will be described in greater detail below, a first subset of the labels 106 may be assigned to a subset of the images 104 by one or more users, and a second subset of the labels 106 may be automatically assigned to a subset of the images 104 through machine learning and inference.

An interface component 110 may access the data store 102 and retrieve a subset of the images 104 for presentation to a user 112. Pursuant to an example, the interface component 106 can cause a graphical user interface to be generated and displayed to the user 112 on a display screen of the computing device, wherein the graphical user interface facilitates receiving labels from the user for an image or series of images. The interface component 110 may receive labels assigned to images by the user 112, and may cause such labels to be stored in correspondence with the appropriate images. For example, the user may assign a) a first label to an image to indicate an identity of one or more persons in the image; b) a second label to an image to indicate an event that corresponds to the image; and/or c) a third label to an image to indicate a location that corresponds to the image. The interface component 110 may be configured to instruct the user as to how many labels to assign with respect to one or more images.

These labels assigned by the user 112 to a subset of the images 104 can be used in the system to automatically learn relationships between domains and to automatically infer labels to assign to images. As used herein, a "domain" can refer to a particular type of label: for instance, a first type of label may be identities of people, a second type of label may be events that correspond to images, and a third type of label may be locations corresponding to images. Thus, the interface component 110 can act in an interactive manner, requesting that the user 112 assign labels to certain images and providing the user 112 with guesses as to labels of images that the user 112 can confirm. This interactivity can cause the automated labeling of images to occur in a more user-friendly and efficient manner.

An extractor component 114 can have access to the images 104 in the data store 102 and can extract one or more features from one or more of the images 104. Features that may be extracted by the extractor component 114 may include features that correspond to identity of people in the images 104, events that occur with respect to the images 104 and/or locations pertaining to the images 104. For instance, the extractor component 114 may be configured to recognize that one or more faces exist in an image and can extract features pertaining to such faces including, for instance, eye color, shape of one or more facial features, hair color, etc. Additionally, the extractor component 114 may be configured to extract data pertaining to clothing worn by certain individuals. Further, the extractor component 114 can extract data pertaining to an event corresponding to one or more of the images such as time stamps of the images, activities identified in the images (e.g., an individual running or jumping), etc. Still further, the extractor component 114 can be configured to extract data pertaining to locations corresponding to the images. For example, a digital camera configured with GPS functionality may embed geographic coordinates in an image and the extractor component 114 can be configured to extract such coordinates from the image. In another example, the extractor component 114 may be configured to generate a color signature pertaining to background scenes of images or other features that can indicate a location pertaining to an image.

The system 100 also comprises an accessor component 116 that can access the data store 102 and retrieve the labels 106 and the co-occurrences 108 therefrom. Co-occurrences indicate that an image has a first label corresponding to a first domain as well as a second label corresponding to a second domain. In an example, the co-occurrences 108 can include data that indicates that an image includes a label that identifies a first person and includes another label that the image corresponds to a first event. Thus, the first person and the first event are co-occurrences in the image. These co-occurrences 108 can be obtained from the labels assigned to images by the user 112 as well as labels automatically assigned to images in the data store 102.

The system 100 further comprises a plurality of computer implemented models 118 that are configured to model certain domains and relationships between elements of different domains. Specifically, the plurality of models 118 comprise two models 120-122 that are configured to model two different domains. For example, the models 120-122 may be Hidden Markov Models, Bayesian Networks, a collection of classifiers, or other suitable models. The plurality of models 120-122 may correspond to any suitable plurality of domains. In an example, the first model 120 may correspond to the people domain and the second model 122 may correspond to the events domain, such that the first model 120 is configured to output labels for people captured in images and the second model 122 is configured to output labels for events pertaining to images. For any image, the people domain may have, for instance, a plurality of elements (people captured in the image) and a plurality of classes (distinct possible labels) for the elements. In the people domain example, an element in an image may be a person and a class may be a name of such person. In the event domain, for a particular image, an element may be an event that corresponds to the image and a class may be possible labels of such event (birthday party, Christmas party, family reunion). Thus, based at least in part upon the labels assigned to the subset of images by the user 112 and features extracted by the extractor component 114, the models 120 and 122 can each be configured to output probabilistic inferences for labels to elements in the images 104, wherein a probabilistic inference from the first model 120 corresponds to an element in a first domain and a probabilistic inference from the second model 122 corresponds to an element in a second domain.

The plurality of models 118 also comprises a relational model 124 that models relationships between elements of the domains modeled by the models 120 and 122. For example, the first model 120 may model the people domain and the second model 122 may model the event domain. In such an example, the relational model 124 can indicate which people are likely to attend which events pertaining to the images (and can also indicate which events are likely to be captured in an image given identities of people in the image). In an example, the relational model 124 may be in the form of a relational table, wherein values of the table are indicative of a likelihood that elements of different domains correspond to one another in an image.

The models 120 and 122 and the relational model 124 can be configured with data accessed by the accessor component 116 and features extracted by the extractor component 114. Specifically, the first model 120 and the second model 122 can receive the labels 106 in the data store 102, the features extracted from the images 104 by the extractor component 114, and current state of the relational model 124. In an initial stage, the state of the relational model 124 may be some constant (e.g., zero).

An inference component 126 can analyze state of the models 120 and 122 and can output inferred labels for elements in the images 104 based at least in part upon the state of the models 120 and 122. In an example, the inference component 126 can output probabilistic inferences. For instance, the inference component 126 can output a label for an element in an image together with some indication of a probability that the label is correct. Such inferences (together with associated probabilities) can be retained in the data store 102 with the labels 106, and the co-occurrences 108 can be updated based at least in part upon such labels (the labels assigned to images by the user 112 and the inferred labels output by the inference component 126).

The system 100 can also comprise a learning component 128 that can be employed to estimate/learn the relational model 124 (e.g., learn values of a relational table). In an example, the learning component 128 can receive the labels 106 and the co-occurrences 108 from the data store 102, and can estimate/learn the relational model 124 based upon such labels 106 and co-occurrences 108. As indicated above, learned relationships represented by the relational model 124 can be utilized to configure the models 120 and 122, and labels for images can be inferred based at least in part upon the learned relationships. The learned relationships can be updated based at least in part upon the inferred labels. This process can iterate until labels are inferred with a threshold probability or until probabilities corresponding to labels converge.

A label assignor component 130 can receive inferences output by the inference component 126 and can automatically assign labels to a subset of the images 104 in the data store 102 based at least in part upon such inferences. In another example, the label assignor component 130 can assign labels to images upon receiving an indication from the user 112 that a label is correct. For instance, the label assigner component 118 can receive a particular label with respect to an element in an image from the inference component 126, wherein the particular label has a certain probability corresponding thereto. The label assignor component 130 can compare such probability with a predefined threshold, and if the probability is above the threshold the label assignor component 130 can label the element with the label output by the inference component 126. If the probability is below a threshold, the label assignor component 130 can be in communication with the interface component 110 and can inform the interface component 110 that a certain element in an image cannot be labeled with a sufficiently high probability of the label being correct. The interface component 110 may then request the user 112 to assign a label to the identified element.

More detail pertaining to the extractor component 114 will now be provided. As indicated above, the extractor component 114 can be configured to extract features from the images 104. The extractor component 114 can convert distances between extracted features to kernel values that represent similarities between features. This can be undertaken through utilization of the following algorithm:

$$k = (x_1, x_2) = \exp\left(-\frac{1}{\sigma^2} d^2(x_1, x_2)\right).$$

Here $d(x_1,x_2)$ and $k(x_1,x_2)$ are respectively the distance in kernel value between the features $x_1$ and $x_2$. The kernel parameter $\sigma$ can be set for different types of features respectively through cross-validation. If a feature extracted by the extractor component 114 is a time stamp, the kernel value can be set to one when time stamps are within a same time unit and zero otherwise. The time unit can be set based upon the application. For instance, the time unit may be a day, an hour, a week, etc.

Now more detail will be provided with respect to generating a probabilistic framework that includes models of domains as well as relational models. It can be assumed that there are M domains, and the Yth domain can be denoted by $Y_u$. The number of elements and distinct labels in $Y_u$ can be denoted by $N_u$ and $K_u$, respectively. The label of each element in $Y_u$ can be modeled by a random variable $y_{u:i}$ that can take values in $\{1, \ldots, K_u\}$, where i is the index of the element $Y_u$. The feature corresponding to the element $y_{u:i}$ can be denoted by $x_{u:i}$. Furthermore, it can be assumed that two distinct elements (in different domains or the same domain) co-occur if they are associated with a same image. The co-occurrence of the element in the domain $Y_u$ and $Y_v$ can be captured by the indicator function $co_{uv}$ and $co_{vu}$ as defined by the following algorithm:

$$co_{uv}(i,j) = co_{vu}(j,i) = \begin{cases} 1 & y_{u:i} \text{ and } y_{v:j} \text{ cooccur} \\ 0 & \text{otherwise} \end{cases} \quad (1)$$

$R_{uv}$ can denote a relational model (e.g., the relational model 124) between the domains $Y_u$ and $Y_v$ (e.g., the domains modeled by the models 120 and 122), which can be parameterized by a matrix of size $K_u \times K_v$. The entry $R_{uv}(k,l)$ can be the coupling coefficient between class k of domain $Y_u$ and class l of domain $Y_v$. A larger value of a coupling coefficient can indicate higher probability that the elements of corresponding classes are associated with a same image.

The labels of each element in an album can be considered as a whole and the joint distribution can be formulated by enforcing statistical dependencies between elements through a series of potential terms. The logarithm of the joint probabilistic distribution is the following:

$$\log p\left(Y_* \mid X_*; R_*\right) = \sum_{u=1}^{M} \alpha_u \Phi_u(Y_u \mid X_u) + \sum_{(u,v):u \leftrightarrow v} \alpha_{uv} \Phi_{uv}(Y_u, Y_v \mid R_{uv}) - \log Z(X_*; R_*)\right) \quad (2)$$

Here, $Y_*$, $X_*$, and $R_*$ respectively denote the labels, features and relational models while $Y_u$, $X_u$, denotes labels and features of domain $Y_u$. $\alpha_u$ and $\alpha_{uv}$ are positive weights that can control the contribution of different terms in Equation (2).

The term $\Phi_u$ can be referred to as the affinity potential, which can capture the feature-based affinities between elements in domain $Y_u$. The affinity potential can be defined as follows:

$$\Phi_u(Y_u \mid X_u) = \sum_{i=1}^{N_u}\sum_{j=1}^{N_u} w_u(i,j) \mathbb{I}(y_{u:i} = y_{u:j}) = \sum_{i=1}^{N_u}\sum_{j=1}^{N_v} w_{u(i,j)} \sum_{k=1}^{K_u} \delta_k(y_{u:i})\delta_k(y_{u:j}). \quad (3)$$

Here, $w_{u(i,j)}$ is the feature based affinity between $y_{u,i}$ and $y_{v,j}$, which can be set to the similarity value between the corresponding features $x_{u,i}$ and $x_{u,j}$. $\mathbb{I}(\cdot)$ is an indicator where $\mathbb{I}(y_{u:i} = y_{u:j})$ equals 1 when the labels $y_{u,i}$ and $y_{u,j}$ are substantially similar, and equals 0 otherwise. $\delta_k$ is also an indicator, which can be defined by $\delta_k(y) = \mathbb{I}(y=k)$. The affinity potential $\Phi_u$ can reflect the rationale that elements with similar features are likely to be in the same class.

The term $\Phi_{uv}$ can be referred to as the relation potential, which can capture contextual relations between the domains $Y_u$ and $YY_v$. The relational potential can be given by the following algorithm:

$$\Phi_{uv}(Y_u, Y_v \mid R_{uv}) = \sum_{i=1}^{N_u}\sum_{j=1}^{N_v} co_{uv}(i,j)\phi_{uv}(y_{u:i}, y_{v:j}), \quad (4)$$

$$\Phi_{uv}(Y_{u:i}, Y_{v:j}) = \sum_{k=1}^{K_u}\sum_{l=1}^{K_v} R_{uv}(k,l)\delta_k(y_{u:i})\delta_l(y_{v:j}). \quad (5)$$

From Equation (4) it can be discerned that the relation potential is the sum of the potential of all co-occurring pairs between $Y_u$ and $Y_v$. High co-occurrence potential $\phi_{uv}(y_{u:i}, y_{v:j})$ can be obtained when elements are assigned a pair of labels with high coupling coefficients. Hence $\Phi_{uv}$ can be understood as the compliance of the label assignment with the relational model 117. While the models 120 and 122 and the relational model 124 have been described in the context of tagging images, it is to be understood that utilization of a relational model to improve output of probabilistic models can be applied to other contexts.

This formulation described above implicitly assumes that elements in the same class tend to have similar features. While this is reasonable for intrinsic features such as face appearance, it may be misleading if some other features are treated in a substantially similar way. For example, a person may wear different clothes when attending different events. Conditional features can be utilized to model such cases. For instance, the clothes of two detected people can be compared only when they are determined to be at the same event (e.g., determined to be at the same event by the model 114). Thus, the affinity potential based on clothes features can be defined as follows:

$$\Phi(Y_P \mid X_C) = \sum_{i=1}^{N}\sum_{j=1}^{N} w_C(i,j) \mathbb{I}(y_i = y_j)\mathbb{I}(e_i = e_j) \quad (6)$$

In this example, $Y_p$ and $X_C$ respectively denote labels for people and clothes features, $w_C(i,j)$ is a similarity between the clothes of the ith and jth persons. $e_i$ and $e_j$ are the labels of events associated with the images capturing the two persons. The major difference between Equation (6) and Equation (3) is the incorporation of the factor $\mathbb{I}(e_i=e_j)$ in the Equation (6). This factor can serve as a switch that turns the features off when they are compared across events, for example.

Furthermore, some features may be unavailable in practice. For example, facial features may be missing due to occlusion or a time stamp may be lost during image transferring and processing. In such a case, $w(i,j)$ can be set to 0 when corresponding features of either the ith or jth elements is unavailable.

More detail with respect to the relational model 124 will now be provided. The relational model 124 may be unknown in advance and can be learned from user given labels (tags) as well as inferred labels from the models 120 and 122. As the user labeled training set may be relatively small, appropriate regularization can be utilized. For example, occasional co-occurrences in errors due to inference may lead to unstable or even spurious relation which may be misleading if utilized in inference. Thus, the relational model 124 may only include relations that are sufficiently testified by repetitive co-occurrences of events. Sparse relationships between co-occurring elements can be filtered by enforcing a sparsity constraint, which can be accomplished, for instance, through incorporation of L1 regularization. Furthermore, in many image collections sizes of classes may be unbalanced. For example, several family members may appear numerous times, which can result in highly uneven values of coupling coefficients. As a consequence, numerous elements in relatively small classes may be classified to large classes. To balance the coefficients, L2 regularization can be applied. Combining the use of L1 and L2 regularization, a model prior for the relational model 124 may be as follows:

$$p(R) = \frac{1}{Z_{prior}} \exp(-\beta_1 \|R\|_1 - \beta_1 \|R\|_2^2), \quad (7)$$

where $\|R\|_1$ and $\|R\|_2$ are respectively the L1 and L2 norms of the coupling coefficient matrix.

More detail pertaining to the inference component 126 and the learning component 128 will now be provided. Given the collection of images 104 as well as initial labels provided by the user 112 via the interface component 110, the learning component 128 can learn the relational model 124 through, for instance, maximum posterior estimation. In an example, the following object can be maximized with respect to the relational model 124:

$$J_o(R) = \log p(Y_L | X; R) + \log p(R) = \log \sum_{Y_u} p(Y_L, Y_U | X; R) + \log p(R) \quad (8)$$

Here, $Y_L$ and $Y_U$ can denote the labels of the elements labeled by the user and unlabeled elements, respectively. The inference component 126 can infer distribution of $Y_U$ based at least in part upon the substantially optimized R. Both the learning and inference stages of the system 100 (the learning component 128 and the inference component 126) can utilize marginalization over $Y_L$ on a loopy probabilistic network, which can be computationally intractable.

This computationally intractability can be addressed by adopting a variational approach. For instance, instead of directly maximizing $J_o(R)$, the learning component 128 can maximize a variable lower bound as follows:

$$J(R, q) = \sum_{Y_U} q(Y_U) \log p(Y_L, Y_U | X; R) - \sum_{Y_U} q(Y_U) \log q(Y_U) - \log Z(X; R) + \log p(R), \quad (9)$$

where q is a distribution of $Y_U$. Furthermore, the following can be shown:

$$J(R,q) \le J_o(R), \forall q, \quad (10)$$

and the equality holds when $q(Y_U)$ equals the posterior of $Y_U$ (e.g., $p(Y_U, Y_L | X; R)$). Thus, by substantially maximizing the variational objective $J(R,q)$, the learning component 128 can learn the relational model 124 and the inference component 126 can infer the posterior distribution of the labels substantially simultaneously. In an example, this can be learned via the coordinate ascent strategy, which can iteratively update R and q by the following:

$$\hat{q}^{(t+1)} = \arg\max_q J(\hat{R}^{(t)}, q) \quad (11)$$

$$\hat{R}^{(t+1)} = \arg\max_R J(R, \hat{q}^{(t+1)}) \quad (12)$$

Such two formulas respectively correspond to label inference (as undertaken by the inference component 126) and relational learning as undertaken by the learning component 128. As both formulas optimize the same objective, convergence can be guaranteed.

More detail pertaining to one or more of the models 120 or 122 being utilized in connection with outputting an inference for a label will now be described. The models 120 and/or 122 can cause the above computation to be tractable through restricting q to be a factorized distribution as follows:

$$q(Y_U) = \prod_{u=1}^{M} q_u(Y_{u:U}) = \prod_{u=1}^{M} \prod_{i \in U_u} q_{u:i}(y_{u:i}), \quad (13)$$

where $Y_{u:U}$ and $U_u$ denote label variables and indices of all unlabeled elements, respectively. With such factorized approximation, $q_{u:i}$ can be iteratively updated for each element with other elements fixed. The updating formula can be derived as follows:

$$\hat{q}_{u:i}(k) = \frac{\exp(\psi_{u:i}(k))}{\sum_{k'=1}^{K_u} \exp(\psi_{u:i}(k'))}, \quad (14)$$

where $\psi_{u:i}(k)$ can be understood as the weight of assigning label k to the ith element in $Y_u$ and $q_{u:i}(k)$ can be the normalized exponential of $\psi_{u:i}(k)$. The value of $\psi_{u:i}(k)$ can be as follows:

$$\psi_{u:i}(k) = \alpha_u \psi_{u:i}^{(u)}(k) + \sum_{v=1}^{M} \alpha_{uv} \psi_{u:i}^{(v \to u)}(k), \quad (15)$$

where $\psi_{u:i}^{(u)}$ can be given by the following:

$$\psi_{u:i}^{(u)}(k) = \sum_{j=1}^{N_u} w_u(i, j) q_{u:j}(k) \quad (16)$$

This term captures the information from the elements with similar features and combines the label distribution of other elements in the same domain and weights their contributions according to feature affinities.

For conditional features as described above, the weight $w_u(i,j)$ can be modified to be $w_u(i,j) E_q\{\mathbb{I}(e_i = e_j)\}$. In other words, the affinity weights can be modulated by the probability that such affinity weights are associated with a substantially similar event. If there are multiple features used to characterize the elements in the domain, the affinity weights can be added together.

The term $\psi_{u:i}^{(v \to u)}(k)$ can represent messages from domain $Y_v$ to $Y_u$ which can be given by the following:

$$\psi_{u:i}^{(v \to u)}(k) = \sum_{j=1}^{N_v} co_{uv}(i, j) \sum_{l=1}^{K_v} R(k, l) q_{v:j}(l) \quad (17)$$

This formulation can be described as follows: The formulation first singles out co-occurring elements in domain $Y_v$ (by $co_{uv}(i,j)$) and then retrieves their labels (denoted by l). The weight of assigning an element to class k can be determined by its coupling coefficient with the co-occurring label (given by R (k,l)). The formula is simply a probabilistic version of such a reasoning procedure.

Additional details pertaining to learning the relational model 124 are now provided. According to Equation (12), given the inferred posterior q, the learning component 128 can learn the relational model 124 by maximizing the following objective function:

$$E_q\{\log p(Y_L, Y_U | X; R)\} - \log Z(X; R) + \log p(R) \quad (18)$$

In solving this problem, a difficulty is faced in that computation of the log partition function log Z(X; R) is intractable. Since the probabilistic formulation is in exponential family, an upper bound of the log partition function log Z(X; R) can be derived using tree reweighted approximation. That is, the original model can be divided into a convex combination of simpler submodels, and the corresponding convex combination of the log partition functions of these submodels constitute an upper bound of the original log partition function.

In more detail, the probabilistic network can be divided into a convex combination of within-domain affinity graphs and cross-domain relation graphs. As a result, the upper bound of log Z(X; R) can be obtained as the following:

$$\sum_{u=1}^{M} \theta_u A_u = \sum_{u \leftrightarrow v} \theta_{uv} B_{uv}(R_{uv}/\theta_{uv}) \qquad (19)$$

Here, $A_u$ is the log partition function corresponding to the within-domain affinity graph of domain $Y_U$, which does not depend on relational models. $B_{uv}$ is the log partition function corresponding to the cross-domain relational graph between domains $Y_u$ and $Y_v$, which is a function of $R_{uv}$. $\theta_u$ and $\theta_{uv}$ are convex combination coefficients which satisfy $$\sum_{u=1}^{M} \theta_u + \sum_{u \leftrightarrow v} \theta_{uv} = 1.$$

In an example $\theta_u$ can be set to zero and $$\theta_{uv} = \frac{1}{\#}$$

relations.

When the co-occurrence graph is sparse, such graph can be approximated by the following:

$$B_{uv}(R) = \sum_{i=1}^{N_u} \sum_{j=1}^{N_v} co_{uv}(i, j) \sum_{k=1}^{K_u} \sum_{l=1}^{K_v} \exp(R_{uv}(k, l)) \qquad (20)$$

The complexity of $B_{uv}(R)$ is $O(m_u, K_u, K_v)$, where $m_u$ is the number of co-occurring pairs between $Y_u$ and $Y_v$.

Substituting the upper bound of log Z(X; R) given in Equation (19) for log Z(X; R) results in a variational learning problem that is to maximize a concave lower bound of the original objective. In this problem the learning of each relational model is separated. In particular, $R_{uv}$ can be solved by maximizing the following objective:

$$E_q\{\Phi_{uv}(Y_u,Y_v|R_{uv})\} - \theta_{uv}B(R/\theta_{uv}) + \log p(R_{uv}), \qquad (21)$$

where $$E_q\{\Phi_{uv}(Y_u, Y_v \mid R_{uv})\} = \sum_{i=1}^{N_u} \sum_{j=1}^{N_v} co_{uv}(i, j) \sum_{k=1}^{K_u} \sum_{l=1}^{K_v} R(k, l) q_{u:i}(k) q_{v:j}(l) \qquad (22)$$

In an example, L-BFGS algorithm can be used to solve this problem. Since the objective function is concave, global maxima is warranted.

In summary, the framework described in FIG. 1 includes a plurality of probabilistic models, at least two of which are configured to model domains, wherein each model can be utilized in connection with inferring labels for elements of a domain. Relational models that provide cross-domain context can be learned while the probabilistic models are utilized to infer the labels to assign to the elements. The probabilistic models can be configured to utilize the cross-domain context in connection with performing inference, and the inferences generated through utilization of the models can be employed to learn the relational models. This framework can be utilized in a variety of settings. An example setting described above includes utilizing the framework to assign labels (tags) to images.

Figure 2:
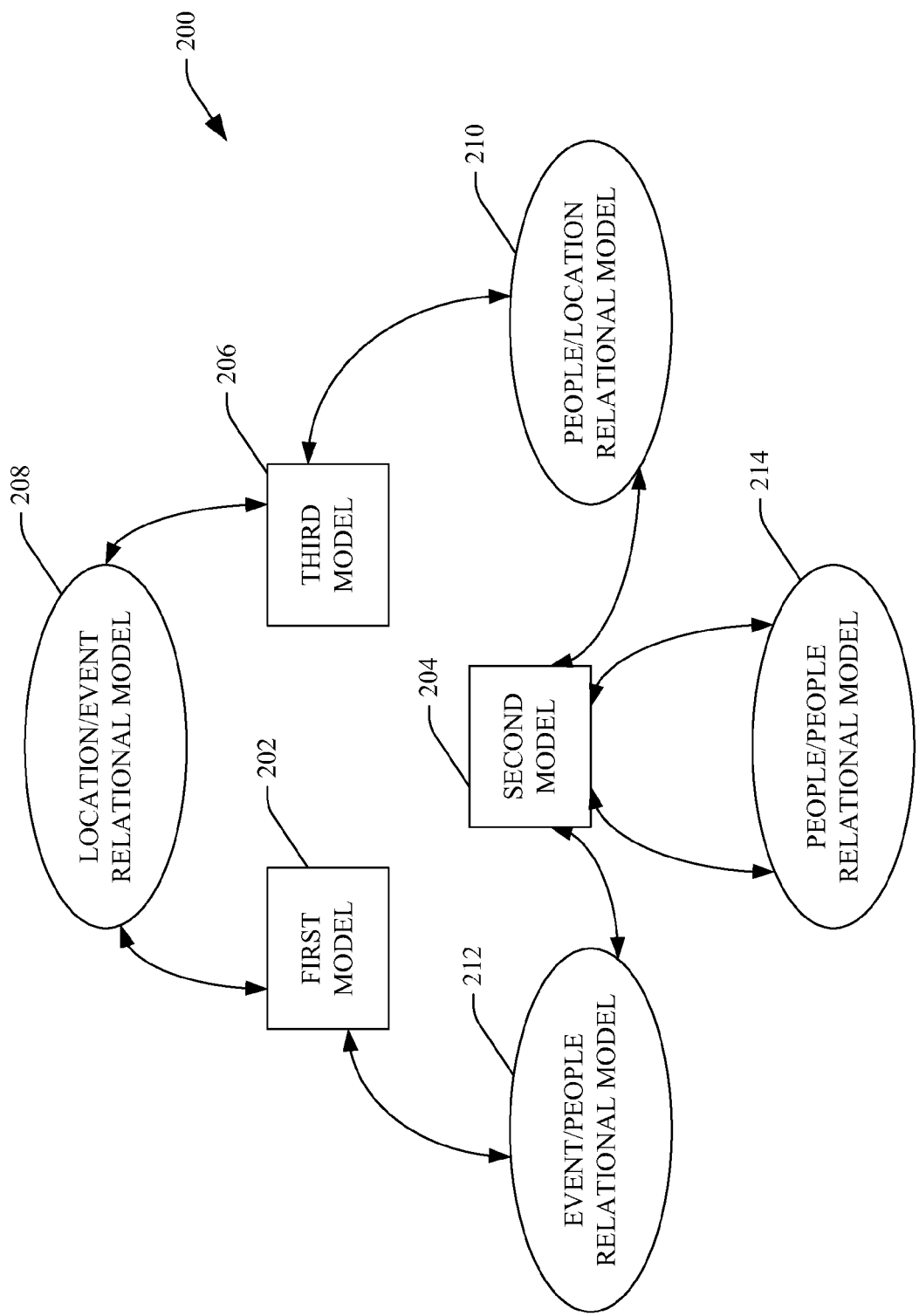
FIG. 2 is a functional block diagram illustrating a plurality of semantic models and learned relational models therebetween.

Referring now to FIG. 2, an example framework 200 that can be utilized in connection with automatically labeling elements in images is illustrated. The framework 200 includes a first probabilistic model 202 that pertains to the event domain. That is, the first probabilistic model 202 is employed in connection with probabilistically inferring an event corresponding to an image. The framework 200 additionally includes a second probabilistic model 204 that pertains to the people domain (e.g., the second probabilistic model 204 is employed in connection with probabilistically inferring identities of people captured in images in a collection of images). The framework 200 further includes a third probabilistic model 206 that pertains to the location domain. Specifically, the third probabilistic model 206 is employed in connection with probabilistically inferring locations corresponding to images in the collection of images.

A location/event relational model 208 is configured to model relationships between elements in the event domain and the location domain. For example, the location/event relational model 208 can be utilized to model a relationship between events and locations (e.g., given that an image corresponds to a first event, what is the probability that the image corresponds to a certain location?). A people/location relational model 210 can model relationships between elements in the people domain and elements in the location domain. For instance, the people/location model 210 can be utilized to indicate a probability that a certain person will appear at a certain location (and vice versa).

An event/people relational model 212 can be utilized to model relationships between elements in the event domain and elements in the people domain. For example, the event/people relational model 212 can indicate probabilities that certain people are likely to attend certain events (captured in images in a collection of images) and/or that a certain event is likely to include a certain set of people. A people/people relational model 214 can model relationships between elements in the people domain. For example, the people/people relational model 214 can be employed to indicate a probability that certain people will appear together in images. For example, if person X appears in an image, there is a certain probability that person Y will also appear in such image.

The relational models 208-214 may be in the form of relational tables, the contents of which can be learned as described above. Furthermore, it is to be noted that the people/people relational model 214 models relationships between elements in the same domain. These learned relationships between elements of separate domains, as represented by the relational models 208-214, can be utilized to refine inferences generated through utilization of the models 202-206 with respect to labels assigned to elements of domains pertaining to the models 202-206. Additionally, the inferences generated through utilization of the models 202-206 can be employed to refine the relational models 208-214.

Figure 3:
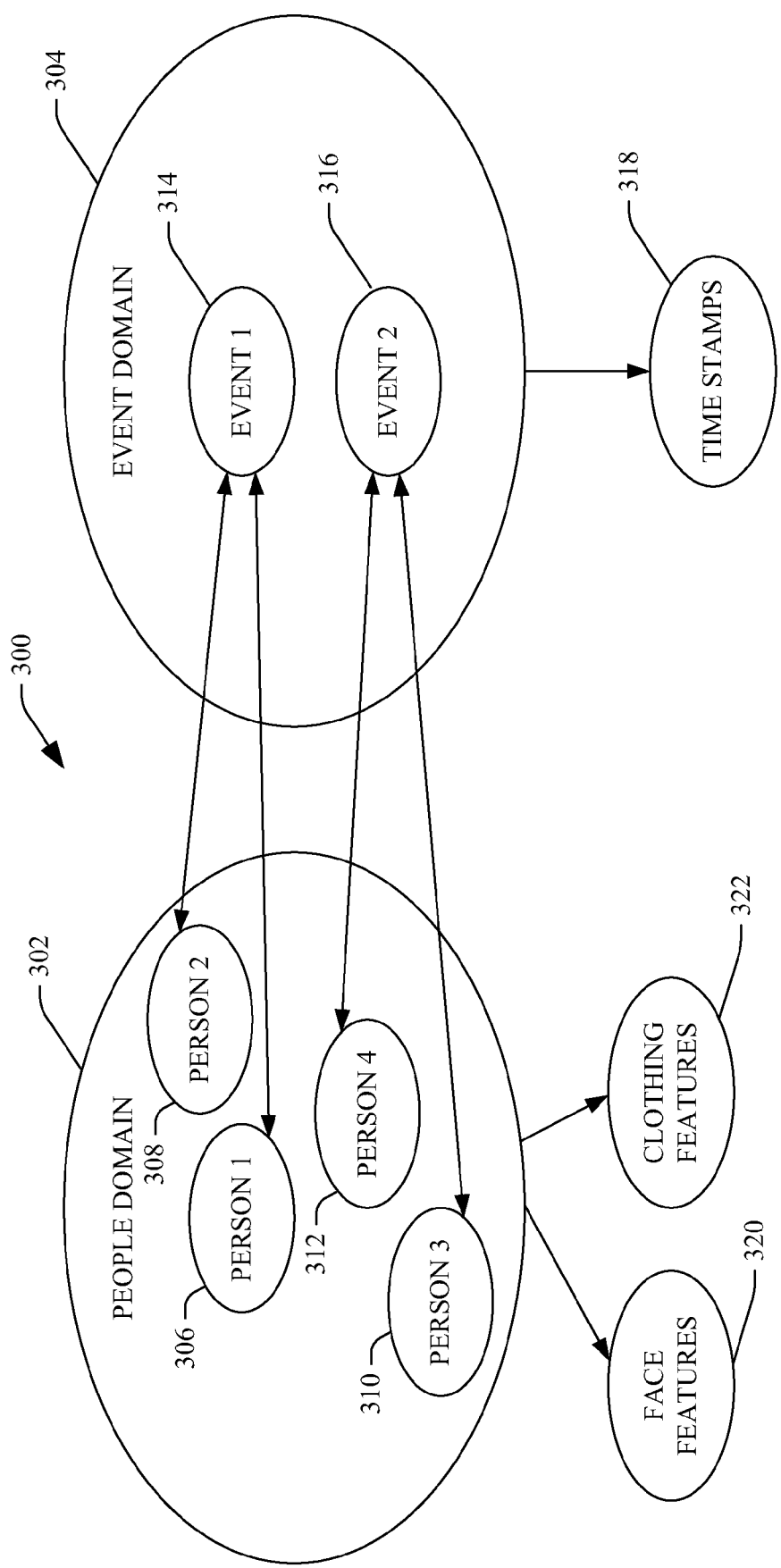
FIG. 3 is an example depiction of relationships between elements of different domains.

Referring now to FIG. 3, an example depiction 300 of relationships between elements of separate domains is illustrated. In this example, relationships between elements in a people domain 302 and elements in an event domain 304 are illustrated. The people domain 302 includes four persons (elements) 306, 308, 310 and 312. Each of these four persons may appear in images in a collection of images that are desirably assigned labels/tags. Specifically, any image may include one or more of the persons 306-312.

The event domain 304 is shown to include two events (elements) 314 and 316. Thus, an image in the collection of images may pertain to one of the events 314 or 316. As described above, time stamps 318 can be characteristic of events in the event domain 304 and facial features 320 and clothing features 322 may be characteristic of the people represented in the people domain 302.

As can be ascertained, there is a co-occurrence of elements in the people domain 302 and the event domain 304. Specifically, if the first event 314 is detected as occurring in an image, the first person 306 and the second person 308 are found to co-occur with the first event 314. Similarly, the third person 310 and the fourth person 312 co-occur with the second event 316. Therefore, if the third person 310 is detected in an image, there is a certain probability that the image corresponds to the second event 316.

Now referring to FIG. 4, an example relational table that represents indications of likelihood of co-occurrence of elements in different domains is depicted. The relational table 400 depicts relationships graphically depicted in FIG. 3. Specifically, if a first person is detected in an image, a value in the relational table (0.9) indicates that there is some certain likelihood that the image corresponds to a first event (e.g., a higher data value indicates a higher likelihood of co-occurrence). In another example, if the third person is detected in the image, a value in the relational table (0) indicates that there is a different likelihood that the first event corresponds to the image.

Figure 5:
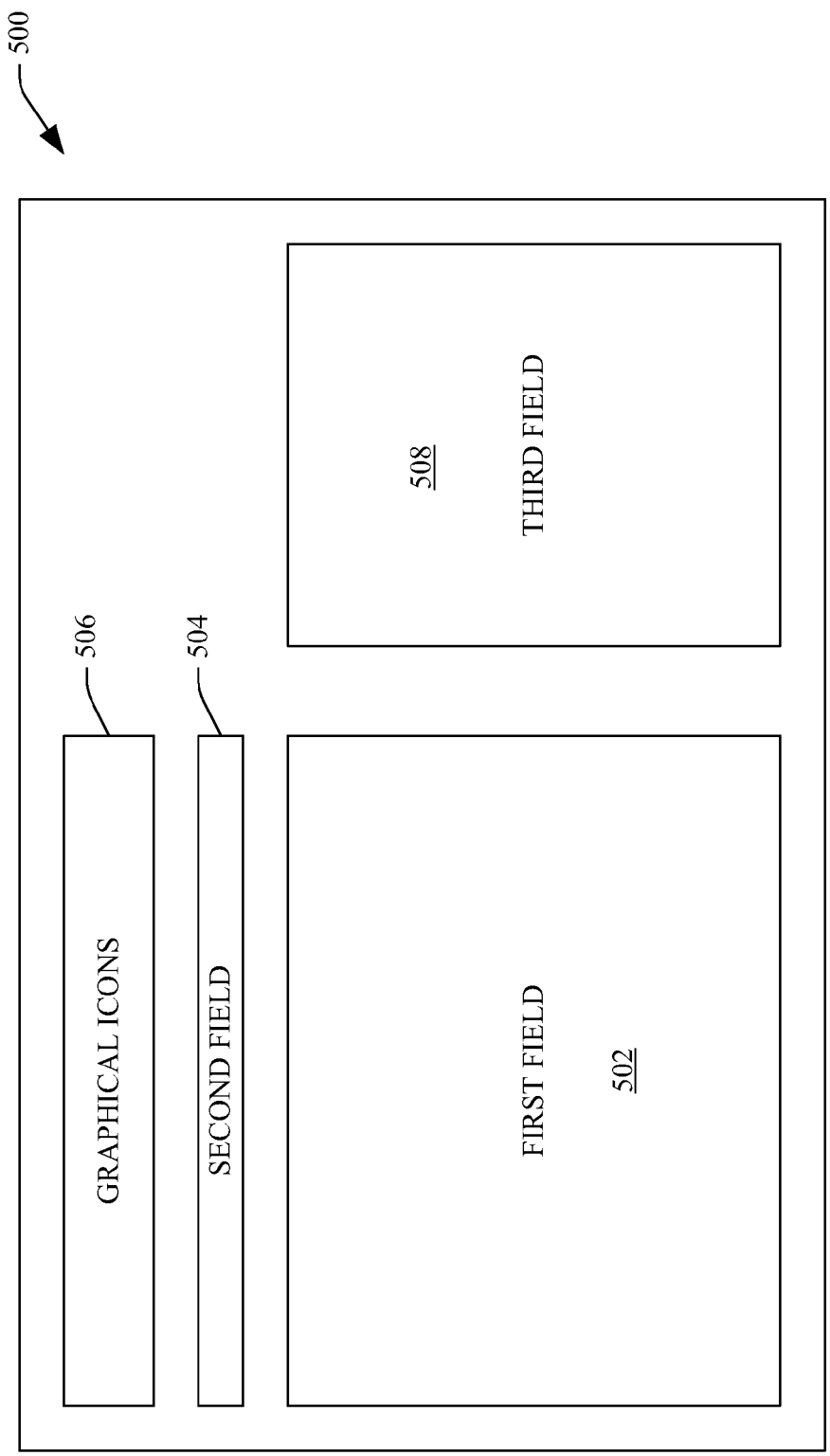
FIG. 5 is an example graphical user interface that can be utilized in connection with assigning labels to images.

Referring now to FIG. 5, an example graphical user interface 500 that can be utilized in connection with the framework described above is illustrated. The graphical user interface 500 includes first field 502 that displays one or more images from a collection of images. A second field 504 can be utilized to receive information from a user as to labels corresponding to elements in the images shown in the first field 502. For instance, the user can utilize the second field 504 to enter a label for a person in at least one image shown in the first field 502, an event corresponding to at least one image shown in the first field 502, and/or a location corresponding to at least one image shown in the first field 502. The graphical user interface 500 may also include a plurality of graphical icons 506 that can be selected by the user to label an element corresponding to an image. For instance, the graphical icons 506 may be icons corresponding to contacts of the user, wherein selection of one of the icons causes an image to be labeled as including a contact that corresponds to the selected icon. A third field 508 may comprise instructions to the user pertaining to how the user is to label elements in an image shown in the first field 502 to substantially optimize performance of the framework described above. For example, the instructions may include instructions for labeling a certain number of people, instructions requesting the user to label each person that is desirably automatically labeled, amongst other instructions. Furthermore, the instructions may include information pertaining to probabilities of labels as generated by the framework. For example, the third field 508 may include text that indicates that an entity has been labeled with a certain probability but confirmation from the user is desired.

Figure 6:
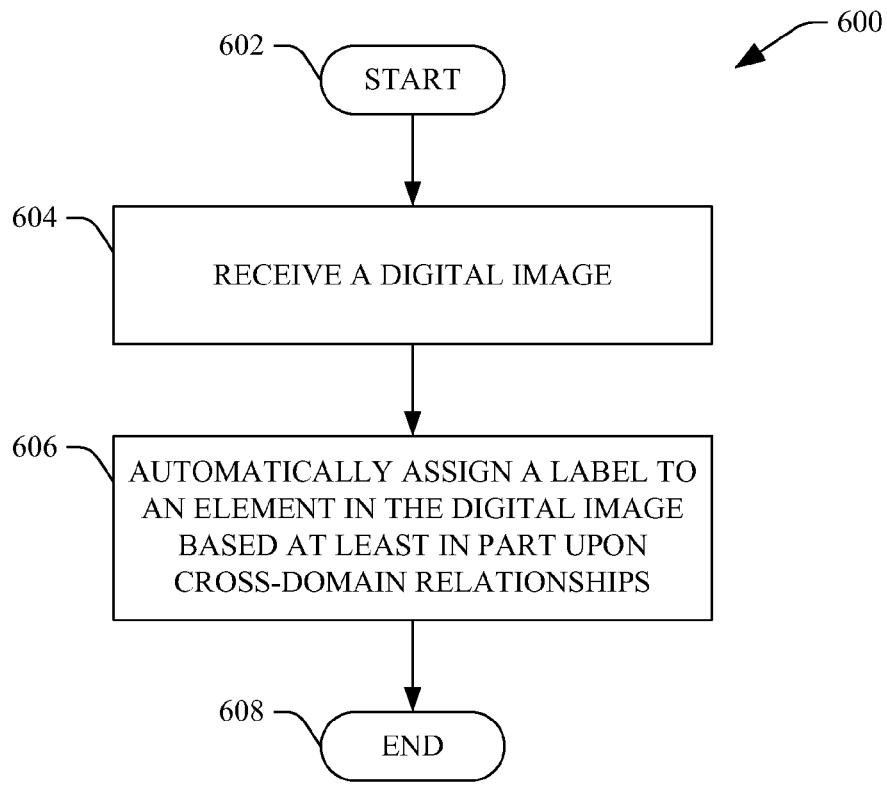
FIG. 6 is a flow diagram that illustrates an example methodology for automatically assigning a label to an image.
Figure 7:
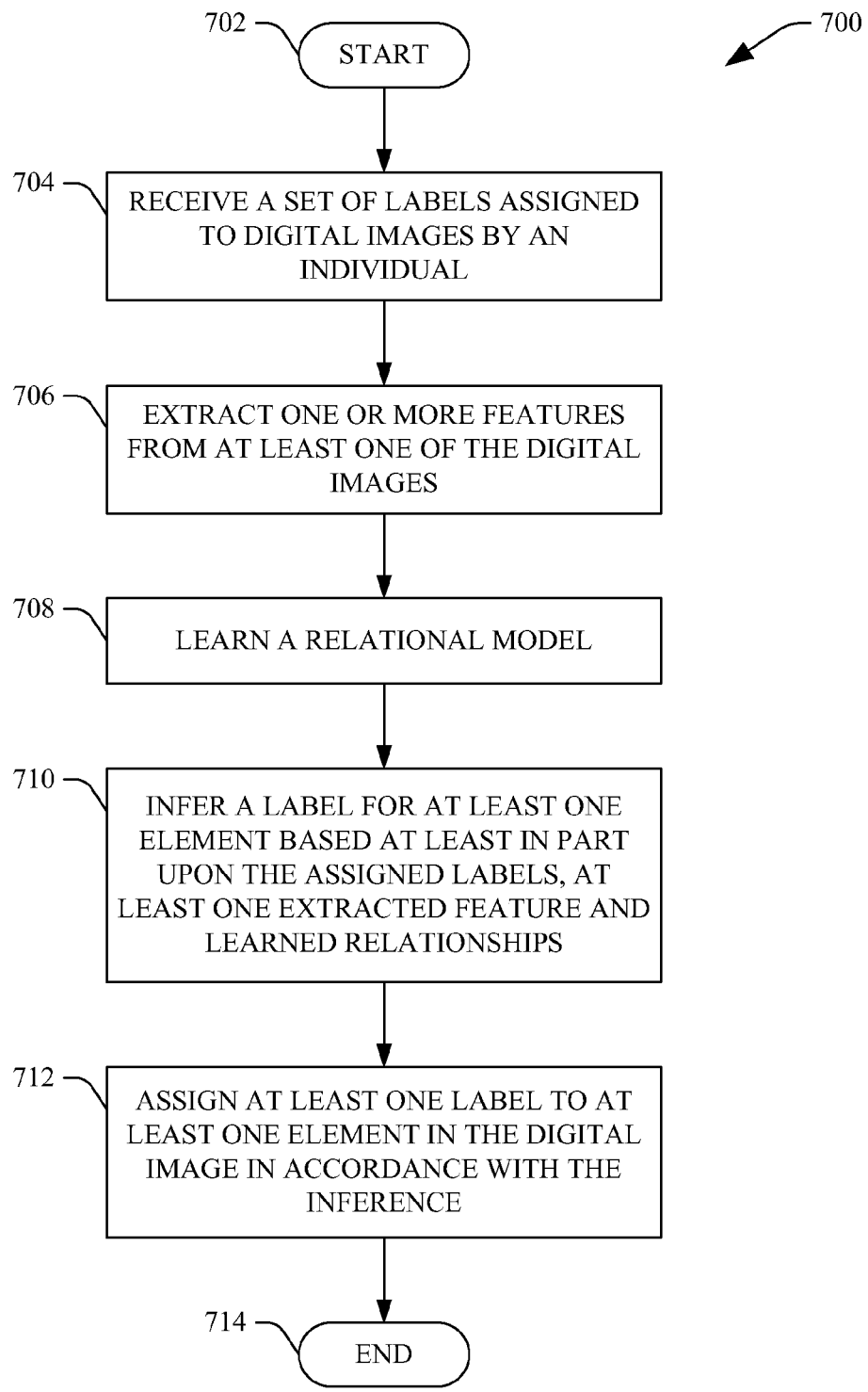
FIG. 7 is a flow diagram that illustrates an example methodology for assigning at least one label to at least one image.

With reference now to FIGS. 6-7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 6, a methodology 600 that facilitates automatically assigning a label to a digital image is illustrated. The methodology 600 begins at 602, and at 604 a digital image is received. For example, the digital image can be received from a computer readable medium or media such as a CD, DVD, hard drive, memory of a computing device, flash drive, or the like.

At 606, a label is automatically assigned to the digital image based at least in part upon learned cross-domain relationships. Specifically, the label is assigned based at least in part upon a computed probability that the label corresponds to an element in the digital image. The probability can be computed through utilization of a plurality of computer implemented models that are configured to infer labels for elements in a plurality of respective domains, such as a people domain, an event domain and a location domain. The probability can be further computed through utilization of at least one relational model that models relationships between elements of different domains (cross-domain context). As indicated above, each of the computer implemented models of the respective domains can be configured to compute a probability for at least one label for an element corresponding to each of the respective domains.

With reference now to FIG. 7, an example methodology 700 for automatically assigning labels to elements in various domains is illustrated. The methodology 700 begins at 702, and at 704 a set of labels is received, wherein the labels are assigned to digital images in a collection of digital images by a user. For example, the user can identify people in the images, events corresponding to the images and/or locations corresponding to the images.

At 706, one or more features are extracted from at least one digital image in the collection of digital images. The extracted feature may be, for instance, facial features of individuals in the image, data pertaining to clothing worn by individual(s) in the image, a time stamp assigned to the image, location data assigned to the image, background scene data of the image, etc.

At 708, a relational model is learned, wherein the relational model is configured to model relationships between elements in different domains. For example, the relational model may be a relational table that indicates probabilities of co-occurrence of elements in different domains in any particular image.

At 710, a label for an element in at least one domain is inferred based at least in part upon the labels assigned by the user at 704, at least one feature extracted at 706, and at least one learned relationship between elements across domains. At 712, at least one label is assigned to the at least one digital image in accordance with the inference. Optionally, prior to assigning the label to the digital image, a user can confirm that the label is correct (or incorrect), and may cause the relational model to be refined based upon such input. The methodology 700 completes at 714.

Figure 8:
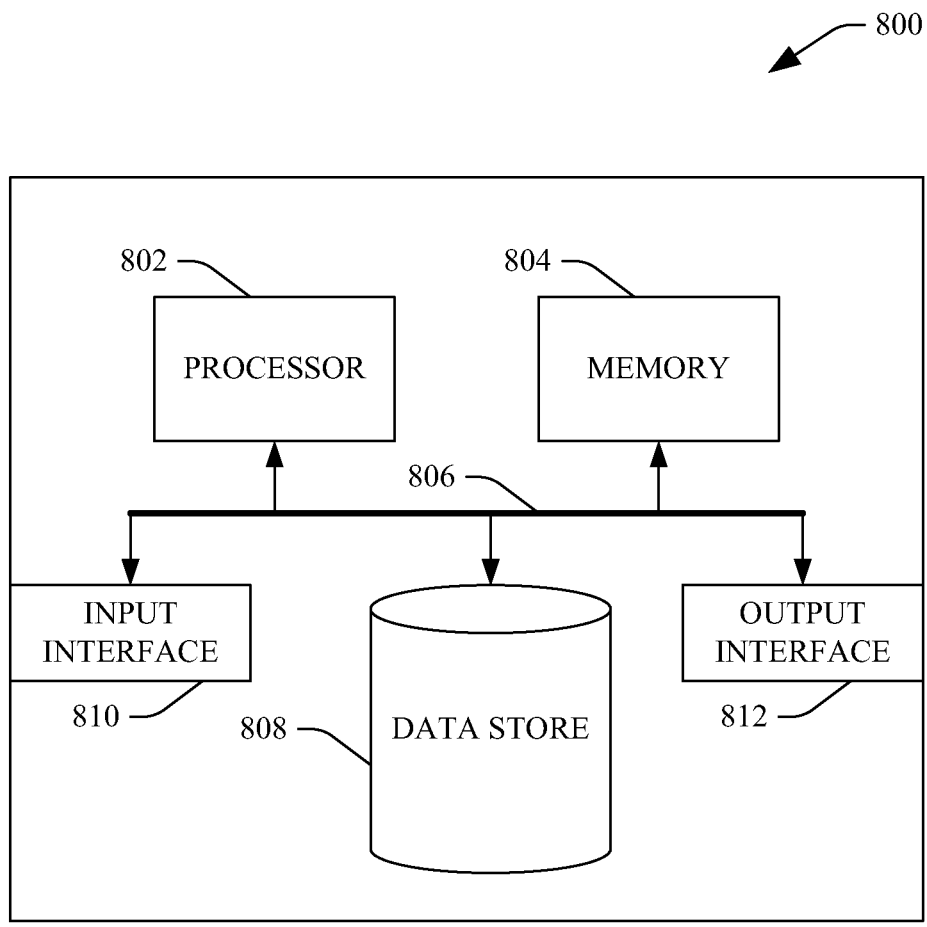
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports automatic labeling of elements in digital images. In another example, at least a portion of the computing device 800 may be used in a system that supports automatically extracting features from digital images. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store relational models, probabilistic models, digital images, etc.

The computing device 800 additionally includes a data store 808 that is accessible by the processor 802 by way of the system bus 806. The data store 808 may include executable instructions, learned models, digital images, etc. The computing device 800 also includes an input interface 810 that allows external devices to communicate with the computing device 800. For instance, the input interface 810 may be used to receive instructions from an external computer device, from an individual, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Further, a system or component may be a series of transistors or a portion of computer memory. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving a digital image, wherein the digital image comprises a first element that corresponds to a first domain and a second element that corresponds to a second domain, wherein the first domain is an event domain representative of events captured in a collection of images, and wherein the second domain is one of a people domain representative of people captured in the collection of images or a location domain representative of locations where the collection of images were captured;
   assigning a label that identifies a name of an event corresponding to the digital image to the first element in the digital image based at least in part upon a computed probability that the label corresponds to the first element, wherein the probability is computed through utilization of a first model that is configured to probabilistically infer labels for elements in the first domain and a second model that is configured to probabilistically infer labels for elements in the second domain, wherein the first model receives data that identifies learned relationships between elements in the first domain and elements in the second domain, and wherein the probability is computed by the first model based at least in part upon the learned relationships.

2. The method of claim 1, further comprising extracting a feature from the digital image, wherein the probability is computed based at least in part upon the feature.

3. The method of claim 2, wherein the feature is characteristic of an element in the first domain, wherein the feature is utilized by the first model to compute the probability.

4. The method of claim 2, wherein the feature is characteristic of an element in the second domain, wherein the feature is utilized by the second model to compute a second probability that the second element is to be assigned a second label, and wherein the learned relationships between elements in the first domain and elements in the second domain are computed based at least in part upon the second probability.

5. The method of claim 2, wherein the feature is one of an article of clothing worn by an individual in the digital image, a color signature of the digital image, a timestamp assigned to the digital image, or location data assigned to the digital image.

6. The method of claim 1, wherein the learned relationships are in the form of a computer-readable relational table.

7. The method of claim 1, further comprising providing a graphical user interface that is configured to receive labels pertaining to elements in the first domain and the second domain from a human.

8. The method of claim 1, wherein the learned relationships are between one or more of people and events, locations and events, and people and locations.

9. The method of claim 1, further comprising:
   receiving a plurality of digital images; and
   automatically assigning tags to each image in the plurality of digital images.

10. The method of claim 1, further comprising:
    assigning a second label to an element in the digital image with a particular probability;
    comparing the particular probability with a threshold probability;
    determining that the particular probability is below the threshold probability; and
    providing a graphical user interface that facilitates receipt of human input, wherein the graphical user interface is configured to accept input from a human pertaining to the second label.

11. A system comprising:
    a processor;
    a memory that comprises a plurality of components that are executed by the processor, the plurality of components comprising:
       an extractor component that receives a digital image and extracts at least one feature from the digital image; and
       a label assignor component that automatically assigns a first label to first element in the digital image and a second label to a second element in the digital image, wherein the first element is in a first domain, wherein the second element is in a second domain, and wherein the label assignor component assigns the first label to the first element in the digital image based at least in part upon learned contextual relationships between elements in the first domain and elements in a second domain, wherein the elements in the first domain are modeled as a respective first plurality of random variables and the elements in the second domain are modeled as a respective second plurality of random variables.

12. The system of claim 11, wherein the first domain is an event domain, and wherein the second domain is a people domain.

13. The system of claim 11, wherein the label assignor component automatically assigns the first label to the first element in the digital image based at least in part upon learned relationships between elements in the first domain.

14. The system of claim 11, wherein the learned relationships comprise probabilities of elements in different domains co-occurring in the digital image.

15. The system of claim 11, wherein the feature extracted is a facial feature of an individual in the digital image.

16. The system of claim 11, the plurality of components further comprising an interface component that provides a graphical user interface that is configured to receive input from a human pertaining to labels assigned to elements in a plurality of digital images.

17. The system of claim 16, wherein the interface component is configured to receive user input to confirm that the label assigned to the element is correct.

18. The system of claim 11, wherein the feature extracted is one of an article of clothing worn by an individual in the digital image or a color signature of the digital image.

19. A computer-readable data storage device comprising instructions that, when executed by a processor, cause the processor to perform acts comprising:

receiving a first set of labels assigned to a collection of digital images by an individual;

extracting one or more features that are characteristic of a respective element from each of the digital images in the collection of digital images;

inferring a second set of labels for elements characterized by the one or more extracted Features;

based upon co-occurrences of labels in the first set of labels and the second set of labels, learning relationships between elements in a people domain, an event domain, and a location domain;

updating the second set of labels based upon the learning of the relationships between the elements in the people domain, the event domain, and the location domain; and outputting a recommendation to the individual of a label in the second set of labels assigned to an element in a digital image in the collection of digital images based at least in part upon the inferring of the second set of labels and the updating of the second set of labels for the elements in the collection of digital images.

20. The computer-readable data storage device of claim 19, wherein inferring a label in the second set of labels comprises computing a probability that the label is correct, the acts further comprising repeating the acts of learning relationships between the elements in the first domain, the second domain, and the third domain and updating the second set of labels until either the probability for the label is above a predetermined threshold or until probabilities collectively computed for the second set of labels converge.

* * * * *